United States Patent [19]

Heikkinen et al.

[11] Patent Number: 5,140,153
[45] Date of Patent: Aug. 18, 1992

[54] CIRCUITRY FOR COMPENSATING FOR THE EFFECT OF LIGHT ON THE OPERATION OF INFRARED-SENSITIVE PHOTOTRANSISTORS IN A CONTACT DISPLAY PANEL

[75] Inventors: Kari Heikkinen, Pukkimäenkatu; Juha Savolainen, Sepänkatu, both of Finland

[73] Assignee: Heikki Marttila Oy, Jyvaskyla, Finland

[21] Appl. No.: 605,705

[22] Filed: Oct. 30, 1990

[30] Foreign Application Priority Data

Nov. 3, 1989 [FI] Finland ................................. 895243

[51] Int. Cl.$^5$ .................................................. G01V 9/04
[52] U.S. Cl. ................................... 250/221; 250/214 B
[58] Field of Search ............... 250/214 R, 214 C, 221, 250/222.1, 214 B; 340/555, 556, 557

[56] References Cited

U.S. PATENT DOCUMENTS

| 4,707,689 | 11/1987 | DiPiazza | 250/214 B |
| 4,799,044 | 1/1989 | Masters et al. | 250/214 B |
| 4,988,983 | 1/1991 | Wehrer | 250/221 |

Primary Examiner—David C. Nelms
Attorney, Agent, or Firm—Armstrong & Kubovcik

[57] ABSTRACT

The invention relates to a circuitry for compensating the effect of external light on infrared-sensitive phototransistors in a contact display panel, the phototransistors being coupled via diodes to a common line. The compensation circuitry is a voltage-dependent resistor between the common line and the ground of the circuit, the resistance value of the resistor decreasing as the direct-voltage level of the line rises. The resistor is preferably a transistor circuit.

7 Claims, 1 Drawing Sheet

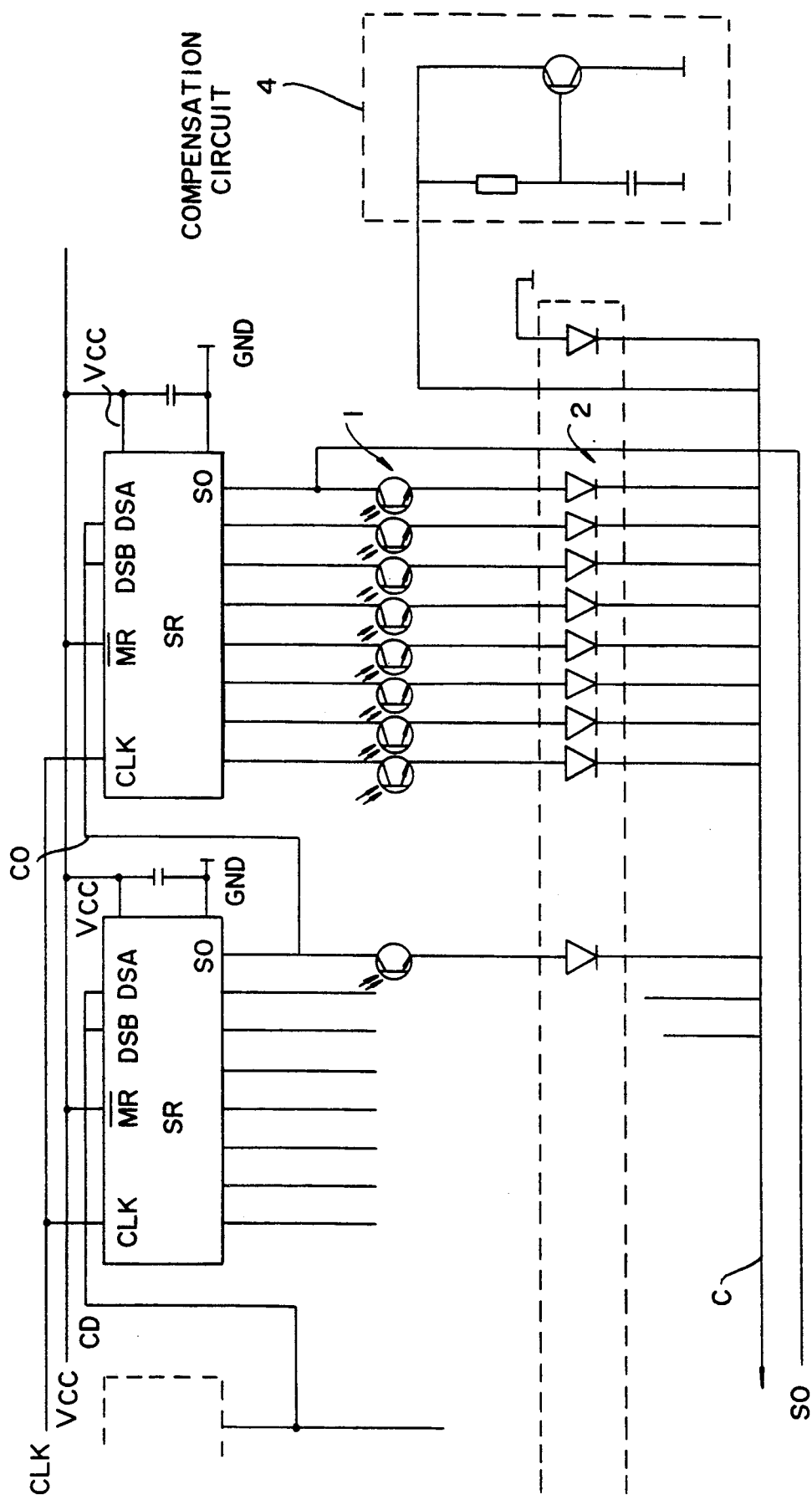

CIRCUITRY FOR COMPENSATING FOR THE EFFECT OF LIGHT ON THE OPERATION OF INFRARED-SENSITIVE PHOTOTRANSISTORS IN A CONTACT DISPLAY PANEL

BACKGROUND OF THE INVENTION

The invention relates to a circuitry by means of which it is possible to compensate for the effect of external light on phototransistors used in a contact display panel.

A contact display panel circuitry comprises one or several transfer registers having a series-form input and a parallel-form output. A phototransistor and a diode emitting infrared light are coupled to each of the parallel outputs. According to Patent Application FI-895242, there may be coupled in series with a phototransistor a diode by means of which the transistor of each output is coupled to a common line. The shift registers scan the phototransistor-diode pairs of the parallel outputs of the shift registers, giving to each of them in turn a voltage pulse, and the pulse frequency, i.e. the frequency between the pulsing of the adjacent phototransistors, is approx. 1 kHz. Depending on the component type, the phototransistors are sensitive, for example, within a wavelength range of 700–1100 nm, which is in the main infrared range. The phototransistor and the infrared diode coupled to the output of a shift registers are arranged so that the transistor and the diode are located in alignment on opposite sides of the display. The phototransistors are thus on two adjacent sides of the display and the corresponding infrared diodes are on the sides opposite to them. When a point in the display is touched, the radiation pulses of the diodes transmitting infrared radiation in the vertical and horizontal directions (1 in each direction) at this point cannot reach the corresponding phototransistors, whereupon modulation caused by the infrared beam disappears from the pulse received from their emitter. The logic circuit of the device is capable of determining the location of the contact point (coordinates X, Y) on the basis of the lacking modulation.

Since all of the phototransistors are coupled via the diodes described in said Patent Application FI-895242 to a common line leading to the logic circuit, it is important that the direct-voltage level of this line should remain as stable as possible. However, this is not always the case; phototransistors also react to intense external radiation which is within the wavelength range of light. When external light strikes the components, the collector current of the phototransistors begins to grow, the transistors begin to "open", and as a consequence of this the direct-voltage level of the said line begins to rise. When the DC level has risen to a sufficiently high level, the phototransistors will no longer react to infrared radiation and the contact display will no longer operate in the desired manner. This phenomenon is detrimental, since, when a device equipped with the said panel is used outdoors, for example in automobile use, even sunlight will cause operational disturbance. It has been observed that, for example, even bringing an ordinary desk lamp to a distance of approx. one meter from the phototransistors suffices to raise the DC level of the line to such a level that the transistors no longer react to infrared radiation.

Attempts have been made to solve by mechanical means the problem of disturbances caused by external light to infrared components: attempts have been made to shield the components with various types of casings and with plastic sheets, placed to shield the components, which to some extent filter external light. These mechanical shielding means increase the size of the circuit, which is of course detrimental in small-sized devices, and increase the costs.

The present invention discloses a circuit by means of which the prior-art mechanical shield structures can be eliminated, is inexpensive, and enables very small-sized infrared components to be used. The invention is characterized in that between the line to which the phototransistors are coupled via diodes and the ground of the circuit there is coupled a voltage-dependent resistor which tends to maintain the DC level of the line constant.

SUMMARY OF THE INVENTION

Brief Description of the Drawing

The sole Figure schematically depicts a circuit of for a contact display panel according to the invention.

DETAILED DESCRIPTION OF THE PREFERRED EMBODIMENT

The circuitry includes a plurality of SI/PO shift registers 1, each of which has a series-form input and a parallel-form 26B output. The inputs of the shift registers are, in a known manner, a clock signal CLK, the supply voltage VCC, the ground node GND, the control data CD, which in this example is connected to two inputs DSA and DSB, and the inverted Master Reset MR, which in this example is not active, because it is connected to the supply voltage. The pulse frequency of the shift registers is ≈1 kHz. To the output of each shift registers SR there is coupled a phototransistor 2, which is further coupled via a diode 3 to the common line c. The most sensitive range of the phototransistors 2 is, for example, approx. −900 nm. The conductivity of any of the phototransistors can be seen from the modulation signal multiplied on the direct-voltage level of the line c, and the cutting off of the infrared beam will cause an absence of modulation. In order that the DC-level of this line should not rise to too high a level, according to the invention there is coupled between this line and the ground a voltage-dependent resistor 4, which is a transistor circuit. The circuit simply comprises a transistor 5, between the base and the ground of which there is a capacitor 7 and between the base and the collector a resistor 5. The emitter is coupled directly to the ground. The time constant RC of the resistor and the capacitor is greater than the said pulse frequency 1 kHz, in order that the base voltage should change sufficiently slowly according to the DC level of the line c. When the DC level of the line c tends to grow, the current passing via the transistor 5 increases and its collector voltage, i.e. the direct voltage of the line c, decreases. Respectively, then the voltage of the line c has decreased to its desired level, the conductivity of the transistor 5 decreases. In this manner the DC level of the line c is simply prevented from rising to so high a level that the operation of the phototransistors would be disturbed.

By using the circuitry disclosed, the disadvantages involved in the prior-art mechanical shielding of infrared components are eliminated in a simple manner. It has been observed experimentally that a desk lamp can be brought to a distance shorter than 0.1 meter the from phototransistors before their operation is disturbed. The improvement is significant, because previously the corresponding distance was approx. one meter. With the circuitry according to the invention, the voltage across the phototransistors will remain sufficiently high, in which case the internal capacitances will remain low and the operating point will remain within a linear range. The circuitry also enables a low supply voltage (5 V) to be used, and leveling out the differences among electronic characteristics, caused by the tolerances of the phototransistors. The circuitry enables inexpensive infrared components without casings to be used, and, owing to the absence of casings, it is possible to use small-size components.

The voltage-dependent resistor used may also be a phototransistor instead of a bipolar transistor. The phototransistor must in this case be such that it works linearly even if an external source of light is intense and if the phototransistor has to be placed mechanically in such a place that it will detect maximally the intensity of external light.

We claim:

1. An electronic circuit which compensates for the effect of external light on the operation of infrared-sensitive phototransistors, comprising:
   at least one SI/PO shift register pulsed at a pulse frequency;
   a plurality of phototransistors each connected to said at least one SI/PO shift register, each of said plurality of phototransistors being electrically coupled in series to a respective one of a plurality of diodes, all of said plurality of diodes being electrically connected to a common line; and
   a voltage-dependent resistor electrically connected between said common line and a ground, said voltage-dependent resistor having an electrical resistance which decreases as a direct-voltage level of said common line decreases.

2. A circuit according to claim 1, wherein said voltage-dependent resistor comprises a transistor circuit having a transistor, a capacitor, an register, in which the collector of the transistor is coupled to said common line, the emitter is coupled to the ground, and the base is coupled to the ground via said capacitor and to said common line via said resistor, and said transistor circuit has an RC time constant due to said capacitor and said resistor which is greater than the length of the cycle of said pulse frequency.

3. A circuit according to claim 2, wherein said transistor is a phototransistor which is disposed such that it detects the intensity of external light.

4. A circuit according to claim 1, further comprising a contact display panel in which said circuit is employed.

5. A contact display panel circuit for a contact display panel, comprising:
   a plurality of phototransistors on two adjacent sides of the contact display panel;
   a plurality of first diodes arranged on an opposite side of the contact display panel from respective oppositely disposed ones of said plurality of phototransistors, said plurality of first diodes emitting infrared radiation to the oppositely disposed ones of said plurality of phototransistors;
   each of said plurality of phototransistors being electrically connected in series with one end of one of a plurality of second diodes;
   a common line connecting the other end of each of said second diodes, wherein each of said plurality of second diodes is coupled in series with a corresponding one of said plurality of phototransistors in such a manner that the collector of each of said plurality of phototransistors is coupled to said at least one shift register, and the emitter of each of said plurality of phototransistors is coupled via a respective one of said plurality of second diodes to said common line;
   an electronic circuit which compensates for the effect of external light on the operation of said plurality of phototransistors, said electronic circuit comprising:
   at least one shift register pulsed at a pulse frequency;
   said plurality of phototransistors each being connected to said at least one shift register, and
   a voltage-dependent resistance means electrically connected between said common line and a ground, said voltage-dependent resistance means having an electrical resistance decreases as a direct-voltage level of said common line decreases.

6. A circuit according to claim 5, wherein said voltage-dependent resistor comprises a transistor circuit having a transistor, a capacitor, and a resistor, in which the collector of the transistor is coupled to said common line, the emitter is coupled to the ground, and the base is coupled to the ground via said capacitor and to said common line via said resistor, and said transistor circuit has an RC time constant due to said capacitor and said resistor which is greater than the length of the cycle of said pulse frequency.

7. A circuit according to claim 6, wherein said transistor is a phototransistor which is disposed such that it detects the intensity of external light.

* * * * *